Figure 2:
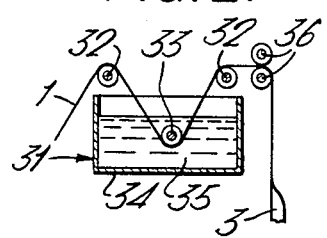

United States Patent [19]

Ernstsson et al.

[11] 3,911,642

[45] Oct. 14, 1975

[54] METHOD FOR THE STERILE PACKING OF A STERILE MATERIAL

[75] Inventors: Georg E. Ernstsson, Staffanstorp; Alfred Fuchs, Lund, both of Sweden

[73] Assignee: Tetra Pak International, Sweden

[22] Filed: Aug. 27, 1973

[21] Appl. No.: 391,556

[30] Foreign Application Priority Data
Sept. 22, 1972 Sweden.............................. 12225/72

[52] U.S. Cl........................... 53/28; 21/54 R; 21/56; 53/167
[51] Int. Cl.².......................................... B65B 55/06
[58] Field of Search ...... 53/28, 167, 180 M, 182 M; 21/2, 54 R, 56, 58, 78, 92, 93, 102 R

[56] References Cited

UNITED STATES PATENTS

| 2,928,219 | 3/1960 | Gubler | 53/180 M |
| 3,269,079 | 8/1966 | Schmied | 53/28 |

*Primary Examiner*—Robert L. Spruill
*Attorney, Agent, or Firm*—Pierce, Scheffler & Parker

[57] ABSTRACT

A method for sterilizing the inside of a packaging tube just prior to filling said packaging tube with a sterile material by radiant heat supplied insidee the packaging tube, and by passing a heated gaseous fluid through the tube.

2 Claims, 2 Drawing Figures

U.S. Patent  Oct. 14, 1975  3,911,642

METHOD FOR THE STERILE PACKING OF A STERILE MATERIAL

The present invention relates to a method for the sterile packing of a sterile material in a filling and forming machine, a flexible packing material web being introduced into the machine and formed to a tube, the inside of which is sterilized by heating, whereupon the tube is partly filled with the sterile material intended for packing, and is then formed to filled and closed containers by the pressing flat of the tube along relatively narrow regions situated transversely to the tube axis and at a distance from each other.

The method in accordance with the invention is applicable to the type of filling and forming machines which are often used for the packing of for example dairy products, such as milk, cream or fruit juices and the like and where the package is made from a web which is formed into a tube. The web in general comprises a carrier layer of paper and one or more layers of a plastic material placed thereon. Since the sterile material packed is of the type which is intended for long-time keeping in unopened packages, also if not stored at low temperature, the packing web must comprise moreover a layer of material which is impermeable for gases, so that, for example, atmospheric oxygen, water vapor and the like cannot penetrate the package through its wall material. The said material layer for the maintaining of aseptic conditions in the package is constituted of a metal foil, for example of aluminium. An example of the various layers which enter into such a packaging material web which is intended to be used in a so-called sterile package may be as follows, reckoned from the inside, namely, one or more layers of a thermoplastic material that can be heat-sealed, for example polyethylene, a metal foil layer, an intermediate plastic layer consisting, for example, of polyethylene, a carrier layer of a more rigid, frequently fibrous material such as cardboard or paper, and finally a layer of plastic material which consists for example, of polyethylene. The said tube is formed so that the longitudinal edges of the packing material are joined together, overlapping one another, and that the overlapping portions are sealed to one another. To protect the cut edge which is present inside the packing tube, and which comprises an unprotected fibrous portion, either a loose plastic strip is arranged over the cut edge, the plastic strip being sealed to the surface of the material web located on either side of the said cut edge, or the plastic strip covering the cut edge consists of a part of the inner plastic layer extending outside the web edge, the projecting plastic strip being sealed to the surface of the material web or tube located underneath the strip.

Such a packing material web is sterilized in the packing machine in that it is immersed or dipped into one or more baths containing a sterilizing or disinfecting liquor. At least one of the said baths is surrounded by a chamber, wherein a sterile environment is maintained. In this sterile chamber is also carried out the forming of the material web to a tube. It was found, though, that this system of chemical sterilization is not rational in modern packing operation and that the system, moreover, involves unnecessarily complicated and above all expensive sterilization devices in the packing machine.

A need existed therefore for a new sterilization system and such a system has also been produced and applied to the packing process under discussion and the system comprises a simpler and cheaper sterilization device. This device, intended for the sterilization of the inside of a packing tube, is characterized in that it consists of a thermal sterilization of the tube, a heating element being fitted inside the tube and above the filled material. The heating element may consist of an electric heat radiation device, by means of which the inside of the tube is heated to a temperature required for the sterilization of the same. A thermal sterilization cannot be obtained, however, unless the inside of the tube is heated to a temperature of up to 300°C. Such a heating temperature can be used when the modern packing machines are constructed with a relatively large packing capacity, which means, among other things, that the speed of movement of the packing tubes is relatively high. All the same, the outside of the tubes has to be cooled at the same time, so that no detrimental alteration of the tube material should occur. The thermal system of sterilization, although appropriate in itself, does bring with it a number of other disadvantages. Thus it was found that the packing machines cannot be stopped during operation, or immediately after a completed packing process, because the packing tube, owing to heat radiation from the heating element, was damaged by charring, which, among other things, means that at least the inner plastic layer cracked, or that it caught fire, which material alterations are naturally inopportune, not least from the point of view of maintaining aseptic conditions since the sterility is hereby lost. This problem is important in particular in the case of narrow tube diameters, because the distance between the heating element and the tube wall in this case is so short that burning occurs already a few seconds after the tube has been stopped. It was not possible to solve the problem in the natural manner, that is by interrupting the supply of electric current to the heating element. The element is thermally too slow for this. A further inconvenience, which arose owing to the use of high heating temperature for the sterilization of the tube, is that the moisture inherent or present in the fibrous layer evaporates, the steam, in the case of the fibrous layer being covered on both sides by thermoplastic material, endeavouring to escape through these materials. If the packing material comprises a metal foil layer, the steam will escape on the other side of the fibrous material layer in respect of the metal foil layer, that is to say the steam will burst the aforementioned plastic strip which protects and covers the fibrous cut edge. In practice it was found that steam often penetrates out through the said plastic strip, bubbles, holes and/or crater-like cavities being formed. As there is always an air gap underneath the strip, the space existing underneath the strip will be filled with the material enclosed in the package. The fibrous cut edge will become soaked and the aseptic state will be lost either through the package being no longer tight or the paper fibres or similar material from the fibrous carrier layer being mixed into the material enclosed in the package.

A series of different arrangements has been proposed so as to prevent at least that the penetration of the steam or the bursting of the thermoplastic cover layer and the said plastic strip destroy the package or the packed material. Thus methods have been worked out for the restoring of the cover layers after the steam has escaped through the same. As far as the aforementioned plastic strip is concerned, all the proposals have been directed towards the totally enclosing covering of the fibrous cut edge with the plastic material, for example a plastic strip, whereby it was intended that no air gap absorbing the filling material should be obtained underneath the strip, but that the latter should tightly enclose the cut edge. These proposals thus did nothing to alter the method of the application of thermal sterilization of packing tubes, but the problem was tackled by attempting to alter the packing material. The said proposals did not prove, however, to give any satisfactory solutions of the problem and the proposals have not found any industrial application.

Through the process in accordance with the present invention, however, the disadvantages which were found to be associated with the application of thermal sterilization methods could be overcome, in that essentially two methods of heating are combined for the heating up of the inside of the tube for the purpose of its sterilization.

The process in accordance with the invention is characterized in that the heating up of the inside of the tube for its sterilization takes place, on the one hand, by means of heat radiation from a heatradiation element which is situated inside the tube, and, on the other hand, with the help of a heat carrier in gas or vapor form which is supplied to the inside of the tube, these heating agents performing during operation the sterilizing heating of the inside of the tube without special cooling of the tube being carried out, while measures are taken when operation is interrupted to prevent any overheating of the tube by the heating agents.

Figure 1:
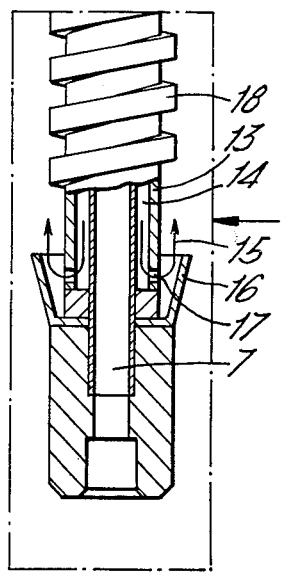
Figure 1:
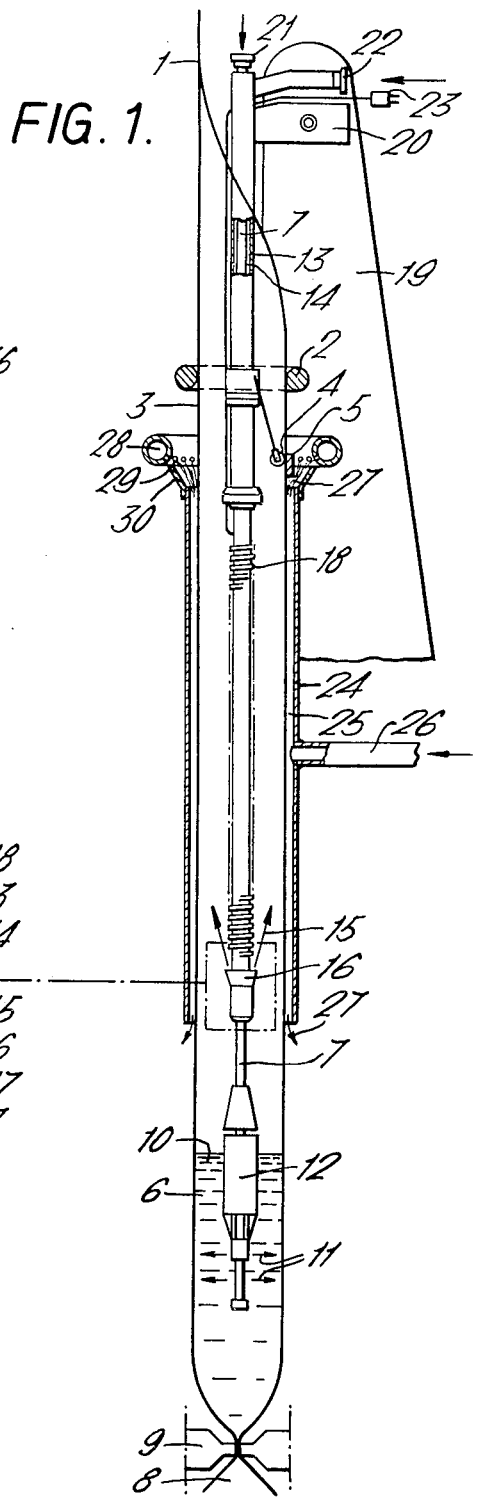

Further characteristic features and advantages of the process in accordance with the invention will become evident from the following description of the invention, where at the same time reference is made to the enclosed schematic drawing, in which FIG. 1 shows in principle and partly in cross-section a filling system of a forming and packing machine together with the device for the sterilization of the packing tube, and FIG. 2 shows a device for the cleaning and/or sterilization of a packing material web by means of liquid agents.

In FIG. 1 reference numeral 1 designates a packing material web which by means of forming rings 2, guide bars or other elements is successively bent over to a packing tube 3 which will have overlapping longitudinal edge portions, which are combined with one another in a longitudinal joint by means of devices intended for this purpose consisting, for example, of a back-pressure roller 4 and a heating element 5. The packing tube so formed is then filled with the filling material 6 intended for packing through a filling pipe 7 located in the tube, and formed and sealed off to separate packing units 8 by means of forming elements 9. As shown in FIG. 1, the material is filled in the packing tube up to a level 10 which is situated higher than the mouth of the filling pipe, which has been indicated by the arrows 11, the filling level being controlled by means of a level vessel 12 containing for example a float and other level-controlling elements, which can preferably be arranged on the lower part of the filler pipe. The upper part of the filler pipe is surrounded by another pipe 13 so that a duct 14 is formed between the pipes. The duct which is intended for guiding a sterile medium, for example sterile air, ends, as shown by the arrow 15, a distance above the said filling material level in a so-called jet-reverser 16. In the enlarged detail sketch of the jet reverser in FIG. 1 it can be seen more clearly that the sterilizing pipe 13 provided for the conduction of the sterile medium extends to the bottom of the jet reverser 16 and is provided with openings 17 in the pipe wall so that the sterile medium is allowed access to the inside of the packing tube. Around the filler pipe and above the jet-reverser a heating element 18 is arranged, for example in the form of a helical electrical heat radiation element. The filler pipe is fitted appropriately to the stand 19 of the packing machine via a bracket 20 or the like. Reference numerals 21, 22 and 23 indicate connections for further lines to a source of filling material and sterile air and to a source of electric current respectively. Furthermore, a jacket 24 is fitted around the filler pipe and co-axial with the same, which surrounds the packing tube 3 when the packing machine is in operation, the jacket together with the packing tube forming an annular gap 25 or duct. The extension of the jacket is such that at least the heating element 18 fitted on or around the filler pipe is surrounded. An inlet line 26 ends in the said annular duct 25 formed between packing tube and jacket for the supply of a gaseous or vaporous heat carrier to the duct. Usually however this inlet line ends in an annular distribution conduit, which is situated around the jacket 24 but in direct connection to the said annular duct 25. The jacket in turn ends in the pipe as shown by the arrows 27. Above the jacket an annular pipeline 28 is arranged, which has nozzle-like openings 29 distributed around its periphery and in the direction towards the packing tube 3, through which, on certain occasions, a heat-absorbing agent supplied under pressure can be sprayed onto the outside of the tube. The pipeline 28 is arranged preferably on the upper end of the jacket 24 by means of a bracing 30 or similar element.

By means of the device 31 shown in FIG. 2 a moistening, a wetting and/or a chemical pretreatment of the packing material web 1 is carried out. By virtue of the moistening of at least the side of the web material which will form the inside of the tube and will be subjected to a considerable amount of heat, any detrimental stresses in the plastic material layer are alleviated and the risk of cracks is reduced because they are equalized through the heating and evaporation of the moisture on and in the packing material. At the same time, owing to the heating and evaporation of moisture on the inside of the packing tube, a more or less tight steam cushion is formed, which keeps the atmospheric oxygen at a distance from the plastic layer and hence reduces surface oxidation. Furthermore, it may be mentioned that the sterilizing effect of the heating process is increased, because bacteria and spores are less resistant in moist heat. It is advantageous to add a wetting agent to the moistening liquor, so that a moisture film which is divided as evenly as possible should be obtained on the side of the material in question. It may also be suitable to carry out a chemical pretreatment of the packing material web, especially when the packing material is to be subjected to a thermal sterilization, whereby such an operation may have the result that a lower temperature can be applied for a complete inactivation of existing bacteria In FIG. 2 is shown, therefore, how the packing material web 1 is immersed with the help of guide rollers 32 and a guide roller 33 in a vat 34 which contains a treatment liquor 35 suitable for the material web. The treatment liquor may consist for example of water for the moistening of the material web, and the water may contain a suitable wetting agent and/or for example a 15% hydrogen peroxide solution for the washing of the material web and inactivation of existing bacteria. The material web 1 so treated is subsequently formed to a packing tube 3 around the filler pipe 7 of the packing machine.

The said moistening and/or wetting operation may also be carried out inside the packing tube 3 formed by the packing machine. For this purpose a circular pipeline is arranged inside the tube which surrounds the filler pipe and is fixed to the same in a suitable manner. A treatment liquor is fed to the pipeline under pressure, the liquor being sprayed against the inside of the tube through nozzle-formed openings present in the pipeline. Under the pipeline a gutter is provided for the catching of any drops formed so that these do not have access to the filling material supplied to the packing tube.

When the device described is to be taken into operation, heated, bacteria-free air is introduced for a start into the space enclosed by the jacket 24. At the same time a part of this air is passed through the supply lines 21 and 22 and through the filler pipe 7 and the duct 14 formed co-axially around the filler pipe for the conduction of sterile air during operation. These measures serve for an introductory sterilization of the device, and more particularly, on the one hand, the inside of the filler pipe 7 and the inlet lines 21 and 22 is sterilized, on the other hand, the parts flushed by hot air inside the jacket 24 as well as the outside of the open lower parts of the filler pipe 7 and the level-controlling element 12.

After all the parts which later will be inside the packing tube 3 have safely obtained sterile surfaces, the longitudinal joint sealing device 4, 5 is switched on and the packing material web 1 is introduced in a suitable manner and is guided downwards inside the jacket 24 until the periphery of the tube is gripped by the forming element 9 and brought forward by the movement of the same, whereby the longitudinal side edges of the material web laid with overlapping are welded together with formation of a longitudinal joint. Subsequently the packing tube 3 is in communication with the outside air only through its upper end.

After the initial sterilization that has been described, and after some empty packing containers or packing containers filled with sterile air have been produced, the sterile material which is to be filled is introduced through the inlet line 21 and the filler pipe 7 instead of the sterile air. The filling material, which for example consists of sterile milk, is filled into the tube up to a filling material level 10 controlled by the level-controlling element 12.

The packing process itself, while maintaining aseptic conditions for the filling and packing of the sterile filling material, takes place in the following manner. After the packing material web 1 has passed through the bath with treatment liquor 35 and the excess of liquor has run off or has been removed from the material web in some other manner, for example in that the same is passed between two rubber rollers 36 which only leave a thin film of treatment liquor behind on the material web, the latter starts to be bent over to tubular shape by means for example of forming rings 2. Before the web has attained tubular shape, however, the longitudinal web edges are dried by means of so-called edge driers, which at the same time may constitute guide bars for the bending over of the web. When the web edges overlap one another they are sealed together or combined in some other manner by means of the longitudinal joining elements 4, 5 to form a tube 3, the plastic strip projecting over one web edge being sealed to the tube material situated underneath the strip.

The packing tube 3 so formed is then passed into the jacket 24 and passes the same while sterile air is being introduced into the tunnel 25 formed between the packing tube and the jacket. The outside of the tube is dried in the process and possible remains of treatment liquor, which for example may consist of hydrogen peroxide and a wetting agent, are made to evaporate at the same time as the sterile air supplied forms a barrier against any penetration into the duct of the surrounding atmosphere. The main purpose in the application of the jacket 24 is however the sterilization of the filling system before the machine is started and the packing process proper is commenced and to maintain a sterile atmosphere around the packing tube 3 during the packing process.

The packing tube 3 in turn surrounds the helical heating element 18, which is arranged so as to heat the inside of the tube and to sterilize, together with a gaseous or vaporous heat carrier fed to the inside of the packing tube, the inside of the tube. So as to prevent that the packing tube is damaged during the thermal heating up of the tube for its sterilization, whereby a heating of the tube up to 300°C may be required in order safely to inactivate or destroy the existing bacteria, one makes use of a heating element which emits a smaller heat effect than those which are used in the known methods. In the present process the packing tube is therefore sterilized with a reduced tube heating effect which is not harmful for the material in the tube and the lower heat effect is compensated by the air which is supplied to the inside of the tube. The hot air consists of a heated, bacteria-free air of a temperature of approx. 280°C. It is known, however, that heated sterile air can be used for the sterilization of packing tubes, whereby, though, the sterile air, naturally has to be supplied to the tube at a temperature of up to 300°C so as to make sure that the tube is in fact sterilized. In the method which is indicated by the invention, the sterile air is introduced into the sterile air line 22 at a temperature of about 200°C and is passed through the duct 14 arranged outside the filler pipe to the mouth 15 of this duct, where the outgoing sterile air has a temperature of 130°C. The packing tube is thus treated with a hot air which is of a considerably lower temperature than what is usual when hot air is used as a sterilization agent. The hot air used in accordance with the present invention is also not harmful to the material in the packing tube, in any case not as long as the tube is being fed forward.

As can be seen from FIG. 1, the sterile air supplied to the inside of the packing tube is directed against the direction of feed or movement of the tube by means of a so-called jet-reverser 16. By means of this a better effect of the hot air treatment is achieved at the same time as a harmful heating of the filling material located underneath the jet-reverser is prevented. Furthermore, it is prevented in this way that the surrounding atmosphere penetrates into the packing tube through its upper, open end because of the rising, sterile air.

The sterile filling material intended for packing for example milk sterilized in a manner not described in detail, is supplied to the packing tube 3 through the filler pipe 3. The supply of the filling material is regulated with the help of the level-controlling element 12 in such a manner that the level 10 of the filling material inside the tube is maintained on a substantially constant level.

The sterile filling material 6 supplied to the sterile packing tube in this manner is packed in individual containers 8 owing to the tube being divided up and pressed together along relatively narrow regions situated transversely in respect of the tube axis and at a distance from one another, by means of forming and closing elements 9. The packing containers 8 become in this way completely filled with filling material 6, since the division of the packing tube takes place below the level of the filling material 10. By the forming operations of the packing tube the level of filling material in the tube will be varied. The individual packing containers 8 which have been sealed off are separated from the packing tube 3 by means of a cut through the said sealing regions. The packing containers are then passed on for packing into transport containers or the like.

When disturbances occur during operation, so that an interruption of the production has to take place, special measures are adopted so as to prevent that for example the packing tube and the filling material are destroyed by the heating agent or that aseptic conditions no longer prevail in the sterile space and in the material. In spite of the fact that the heating element 18 provided in the packing tube 3 emits a smaller heat effect at the same time as the gaseous or vaporous heat carrier supplied to the inside of the tube is introduced at a considerably lower temperature than what is customary in sterilizing processes of the type discussed here, further measures have to be taken so as to prevent, among other things, that the material in the packing tube is subjected to overheating which, among other things, might bring with it changes in the plastic material in the different material layers of the packing tube, a charring of the tube or even the packing tube catching fire.

Such further measures consist in that the heat radiation effect of the heating element 18 is reduced or that it is wholly shut off, as a result of which, among other things, the packing tube is spared. However, the heating elements known hitherto are thermally too slow to allow eliminating with certainty any risks of harmful effect caused by heat radiation from them, so that further measures had to be taken.

In connection with the present process it is suggested that the outside of the packing tube should be cooled, in that at the same time as the heat radiation effect of the heating element 18 is reduced a liquid cooling agent, appropriately water, is allowed to trickle on the outside of at least that part of the packing tube which is situated in, or is surrounded by, the jacket 24. The water is sprayed onto the tube by means of the annular pipeline 28 situated above the jacket 24 and through the nozzle-like openings 29 or the same. Furthermore, the gaseous or vaporous heat carrier, for example sterile air, conducted in the inlet line 22 is cooled in that it is passed through a water cooler, a water bath or any other suitable element. In the course of this the sterile air is cooled down to approx. 70°C from the input temperature during operation of about 200°C in the duct 14 formed around the filler tube. The cooled sterile air, as under operating conditions, is made to flow in the direction towards the open end of the packing tube by means of the jet-reverser 16. In this way a barrier is formed against the penetration of bacteria from the surrounding atmosphere at the same time as a further heating of the inside of the packing tube by means of the sterile air is interrupted.

on the occasion of stoppage of operation the gaseous or vaporous heat carrier conducted in the inlet line 26 is also cooled so that it is supplied to the annular duct 25 formed between the packing tube and the jacket at a lower temperature than during operation.

The measures which are taken on the occasion of stoppage of operation, such as lowering of the heat of radiation, supply of cooled sterile air, spraying of water onto the outside of the tube etc. are of course controlled automatically by elements provided for this purpose in the forming and packing machine. A further measure which is controlled automatically on the occasion of stoppage consists in that when the machine is shut down the sealing pulse in the forming and sealing element 9 will not be completed, which is controlled by a so-called interlocking pulse. The fact is, that the forming and sealing element comprises thin metal sealing strips which rest loosely on a base in the sealing jaw proper. These strips are heated to a very high temperature when the packing tube is sealed and the strips in the sealing zone melt the outer plastic layer on the packing tube. On the occasion of stoppage of operation, the metal strip will attach itself to the packing tube, owing to the melted or halfmelted plastic material sticking between packing tube and strip, as a result of which the loose strip will be pulled or torn from its position when the machine is started up again after the stoppage. This problem has been solved in that a so-called interlocking pulse is introduced which prevents the machine from stopping with a non-completed sealing pulse. A non-completed sealing pulse is in fact not able to melt the said plastic layer on the outside of the packing tube, so that the sealing strip does not attach itself to the tube when the machine is restarted after a stoppage of operation.

In one instance of packages for sterile goods, the inside of the packing tube was sterilized through the effect of heat radiation from a heating element arranged in the tube. The inside of the tube wall was heated up to a sterilizatin temperature of 300°C at the same time as a cooling fluid was directed against the outside of the tube. A number of the packages formed and filled from the tube showed after a period of storage a leakage through the fibrous cut edge. A closer examination of the packages disclosed that the strip arranged on the inside of the package and covering the fibrous cut edge showed holes, which were caused by the water present in the fibrous layer having been converted to steam which in turn had burst the strip. Furthermore, the inner plastic layer of the package showed cracks. Because of these inconveniences the sterility of the packed material could not be maintained in the package. Moreover it was found that the packing tube charred when the machine was stopped, and this in spite of the heating element being cut off at the same time as the stop. This meant that the aseptic conditions were lost. Using this system it was not possible to achieve a safe upkeep of the aseptic state in the filling area.

In another instance of a package, the inside of the packing tube was sterilized on the one hand by means of heat radiation from a heating element arranged in the tube, on the other hand with the help of gaseous or vaporous heat carrier which is supplied to the inside of the tube. The said gaseous or vaporous heat carrier was constituted in one case of sterilized air which was heated up to a temperature of 280°C. The sterile air was supplied to the packing system with an input temperature of approx. 200°C, the sterile air being directed by means of a so-called jet-reverser against the direction of movement and thereby being brought into contact with the inside of tube with an output temperature of 130°C of the sterile air. It was possible here to use an appreciably lower heat radiation effect of the said heating element in order to obtain a sterilization of the inside of the tube. In the course of the packing no separate cooling of the packing tube is applied. After a storage of the packages filled with sterile filling material over a period of time, the same were subjected to an examination wherein no leakage could be detected either through the fibrous cut edge or elsewhere. A closer examination showed that the plastic strip arranged in the package and covering the plastic strip was undamaged and no crack formation or tendency towards crack formation in the inner plastic layer could be detected. On the occasion of an accidental stoppage of operation the heat radiation effect of the heating element was reduced and the heated sterile air supplied to the inside of the tube, which had an input temperature of approx. 200°C was cooled down to an input temperature of about 70°C. During the stoppage of operation, water was applied to the outside of the packing tube as a coolant. After the stoppage of operation it was found that the packing tube had not suffered any harmful alterations. Thus it was possible to maintain the aseptic conditions during stoppage of operation and a direct continuation of the production was possible. It was found that by application of this method the packed material could be kept in the packages for a prolonged period with the sterility of the material being maintained.

Without exceeding the scope of the concept of the invention, modifications of the process described should be possible. Thus different methods and agents may be used for the pre-sterilization of the packing material web as well as gaseous heat carriers other than sterilized air. Furthermore, it may no longer be necessary in the future to cut off the heating element arranged in the packing tube or reduce its heating effect during a stoppage of operation, since it may be regarded as probable that such heating elements will be produced which are not as thermally slow as the ones used at present. The invention is not limited therefore by the instances given as examples, but only by the following patent claims.

What is claimed is:

1. In a method for sterilizing the inside of a tube of packaging material while being filled with a sterile material in a packaging machine in which a longitudinal web of flexible packaging material is continuously formed into a longitudinal tube, is filled with a sterile material from a filler pipe extending into said tube and is finally formed into separate filled packages by sealing the filled tube transversely at spaced intervals, the improvement comprising heating the inside of the moving tube up to 300°C. by means of a radiant heating element in a zone adjacent the filler tube and above the outlet end thereof, simultaneously introducing a gaseous fluid generally in the direction of tube movement at a temperature of about 200°C. into the inside of the tube above the outlet end of and surrounding the filler pipe, and below the zone of heat radiation and deflecting and reversing the direction of flow of the heated gaseous fluid above the level of sterile filler material to flow upwardly over a greater distance than the zone of heat radiation and in a direction opposite to the movement of the tube past the zone of heat radiation by means of deflector means surrounding the filler tube so as to prevent direct impingement of the heated fluid on the sterile filler material beneath the deflector means while maintaining sterile conditions in the tube during filling of the tube.

2. A method as claimed in claim 1 and further comprising contacting the outside of the tube with a heated gaseous fluid during operation of the machine.

* * * * *